SMITH & WESSON.

Cartridge.

No. 2,636. Reissued June 4, 1867.

Witnesses

F. W. Winster.

R. J. Cunningham

Inventors

Horace Smith

D. B. Wesson by their Attorney

E. S. Renwick

N. PETERS, PHOTO-LITHOGRAPHER, WASHINGTON, D. C.

UNITED STATES PATENT OFFICE.

HORACE SMITH AND DANIEL B. WESSON, OF SPRINGFIELD, MASS.

IMPROVEMENT IN PRIMING METALLIC CARTRIDGES.

*Specification forming part of Letters Patent No.* 27,933, *dated April* 17, 1860; *reissue No.* 2,636, *dated June* 4, 1867.

*To all whom it may concern:*

Be it known that we, HORACE SMITH and DANIEL B. WESSON, of Springfield, in the county of Hampden and State of Massachusetts, have invented certain Improvements in Metallic Cartridges, of which the following is a full, clear, and exact description, reference being had to the accompanying drawings, making part of this specification, in which—

Figure 1:
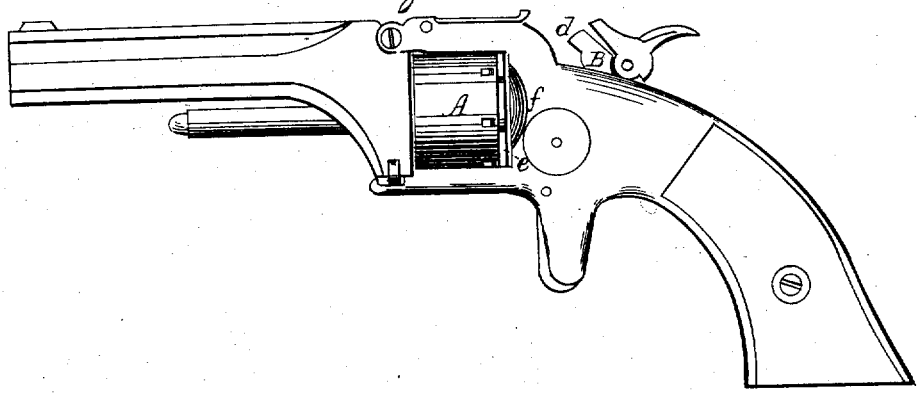
Figure 2:
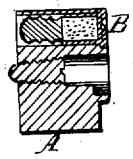
Figure 3:
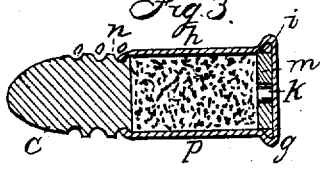

Figure 1 is a view of a revolving pistol in which our improved cartridge is used; Fig. 2, a section through the revolving cylinder and one of the cartridges with the ball attached; Fig. 3, a longitudinal section, enlarged, through one of our cartridges which is charged ready for use; Figs. 4, 5, 6, and 7, details to be referred to hereafter.

Figure 4:
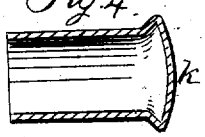
Figure 5:
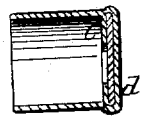

We are aware that a metal cartridge for breech-loading pistols, such as is shown in section, Fig. 5, has been made, in which the fulminate was spread in a thin layer over the entire interior of the base of the cartridge, as shown at *a*, and held in place by a washer of thin metal, *c*, or other material. This description of cartridge is not adapted for a revolving pistol, as shown in Fig. 1. In this pistol, Figs. 1 and 2, chambers are bored through the revolving cylinder A, and the cartridge is inserted from the rear, one being shown at *e*, Fig. 2. The flange base of this cartridge projects beyond the rear of the chamber, and occupies the space between the cylinder and the recoil-plate *f* of the pistol. The explosion of these cartridges from the blow of the hammer causes the base to bulge out, as shown in Fig. 4, by which means the cylinder is jammed and prevented from revolving freely.

Metallic cartridges have also been constructed with a milled washer inserted in their base, and the fulminate contained between the projections and depressions around the edges of the washer, and the interior surface of the cartridge at its base; but these cartridges are not adapted to the cylinder used in our arm, in which the chamber extends entirely through.

Metallic cartridges have also been constructed with a hollow flanged annular base, and the fulminate contained in a hollow ring, which is inserted in the hollow annular base of the cartridge; but this description of cartridge is expensive, and the construction dangerous, from the difficulty of closing and turning the ring after the fulminate is introduced without explosion.

Cartridges have also been constructed with cases composed of two parts of different materials, viz., a hollow cylindrical body, and a shallow flanged capsule, the fulminate being arranged in the annular recess of the capsule, and the cylindrical body having the requisite capacity for the powder and butt of the ball; but such cartridges having the case in two parts, which have to be constructed separately and then put together, are expensive to manufacture; moreover, as the parts are secured to each other by gum or other cement, the cartridges are liable to be opened at the joint between the parts by accidental strains.

To obviate these objections to such preexisting cartridges is the object of our invention, which consists in the arrangement of the fulminate substantially in the periphery of the base of a flanged cartridge-case constructed of one piece and of sufficient length to hold the fulminate, the propelling charge or gunpowder, and the projectile; such a cartridge-case so primed with fulminate in annular form, as distinguished from such a case having the fulminate distributed over its entire base, being a new article of manufacture suitable for conversion into a cartridge. Our invention consists, further, of a complete cartridge composed of the following parts, viz: first, a flanged case or shell, in one piece, of sufficient length to hold the fulminate, the propelling charge, and the projectile; second, the fulminate arranged substantially in the annular recess at the base of the case or thereabout; third, the propelling charge; fourth, the projectile; these four parts constituting a new cartridge.

That others skilled in the art may understand and use our invention, we will proceed to describe the manner in which we have carried out the same.

Figure 6:
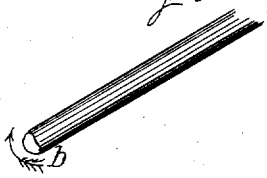
Figure 7:
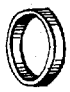

In the drawings, Fig. 3 represents an enlarged section through one of our improved cartridges charged and having the ball attached. *h* is the cartridge-case, which is a cylinder of thin copper, or other suitable metal, the base or head of which is somewhat larger in diameter than the cylinder, and is formed with a flange or ring, *g*, where it joins with the cylindrical part *h*, so that there is an annular space or hollow ring, *i*, formed around the base of the cylinder. Into this annular space *i* the fulminating-powder is forced. Fig. 6 represents the tool which we employ for the purpose. It is of a size suited to the cartridge shown in Fig. 2. A portion of the tool at one end is cut away as at *l*, and as it is revolved in the cylinder *h* in the direction of the arrow, the fulminating-powder is forced out into the annular space *i*, as shown in Fig. 3. After the fulminate is thus pressed into place, it should be permanently secured there, and this may be effected by a wad, *m*, of paper, leather, or other suitable material, which is forced down to the bottom of the cylinder *h*. This wad may be made with a hole through the middle of it, which hole may then be occupied by gunpowder, and thus the fire from the fulminating-powder will be communicated with the greater sureyt to the gunpowder with which the cartridge-case *h* is almost entirely filled, as at *p*, Fig. 3. After the gunpowder is inserted the ball *c* is attached to the cartridge. This ball, which is of the elongated conoidal form, is of such a diameter at its base as to fit snugly into the cartridge-case. It has several grooves *o* around its circumference, into the lower or rear one of which the edge of the case *h* is pressed, as at *n*, Fig. 3, by means of a suitable tool or swage. This secures the ball firmly to the cartridge-case, so that it is held thereby.

After the fulminating-powder has been inserted in the annular space *i*, the cartridge is placed in a tool having a hole of a suitable diameter to receive the cylindrical part *h* of the cartridge. A light pressure is then put upon the head to compress the flange *g*, and bring the metal into closer contact with the fulminate. The blow of the hammer is thus rendered more effective, and the discharge more certain.

When the percussion-powder is thus confined its explosion does not cause the head of the cartridge to protrude, as before described, and the difficulty arising therefrom is entirely obviated.

By introducing the fulminate directly into the annular projecting base without previously inclosing it in a hollow ring, a much less expensive and equally effective cartridge is produced; and by constructing the entire case or shell of one piece of metal instead of two pieces of material, a better cartridge is produced at a less expense.

It is obvious that, in lieu of the wad, other means may be adopted for the purpose of confining the fulminate in place, and of preventing it from being rattled or jarred out when dry, without altering the spirit of my invention. For example, afl at metallic ring, Fig. 7, of a diameter that will just drop to the bottom of the cartridge-case and close the recess *i*, may be employed; or the surface of the fulminate may be varnished, and thus be prevented from cracking and falling out.

We do not claim to be the first inventors of a flanged cartridge case or shell made all in one piece and of a sufficient length to hold the fulminate, the powder, and the projectile; nor do we claim to be the first who arranged fulminate in an annular ring form in the base of a cartridge; but we believe that we were the first who combined in the same cartridge the advantages of both of the said two systems.

What, therefore, we claim as our invention, and desire to secure by Letters Patent, is—

1. A primed cartridge-case composed of two parts, viz: first, a flanged case or shell of one piece of metal, and of sufficient length to hold the fulminate, the propelling charge, and the projectile; and second, the fulminate arranged substantially in a ring form at the base of said shell, in contradistinction to being distributed equally or thereabout over the entire base; the said two parts being combined and arranged substantially as before set forth.

2. A complete cartridge composed of the following parts, viz: first, a flanged case or shell of one piece of metal, and of sufficient length to hold the fulminate, the propelling charge, and the projectile; second, the fulminate arranged substantially in a ring form at the base of said shell, as aforesaid; third, the propelling charge; fourth, he projectile; these four parts being arranged and combined substantially as before set forth.

In testimony whereof we have hereto set our hands this 12th day of November, A. D. 1866.

HORACE SMITH.
DANIEL B. WESSON.

Witnesses:
CHARLES MARSH,
H. N. CASE.